United States Patent
Vie et al.

(10) Patent No.: US 11,725,840 B2
(45) Date of Patent: *Aug. 15, 2023

(54) WIRELESSLY CONFIGURING CLIMATE CONTROL SYSTEM CONTROLS

(71) Applicant: Emerson Electric Co., St. Louis, MO (US)

(72) Inventors: David L. Vie, Union, MO (US); Michael J. Moran, St. Louis, MO (US); John F. Broker, Warrenton, MO (US)

(73) Assignee: Emerson Electric Co., St. Louis, MO (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/517,391

(22) Filed: Nov. 2, 2021

(65) Prior Publication Data

US 2022/0057097 A1  Feb. 24, 2022

Related U.S. Application Data

(63) Continuation-in-part of application No. 16/008,817, filed on Jun. 14, 2018, now Pat. No. 11,193,682.
(Continued)

(51) Int. Cl.
*F24F 11/58* (2018.01)
*F24F 11/41* (2018.01)
(Continued)

(52) U.S. Cl.
CPC .............. *F24F 11/58* (2018.01); *F24F 11/41* (2018.01); *G06V 20/62* (2022.01); *H04L 67/125* (2013.01); *H04W 4/33* (2018.02)

(58) Field of Classification Search
CPC .. F24F 11/58; F24F 11/41; F24F 11/52; F24F 11/523; F24F 11/64; F24F 11/56;
(Continued)

(56) References Cited

U.S. PATENT DOCUMENTS 4,336,902 A  6/1982 Neal
6,739,145 B2  5/2004 Bhatnagar
(Continued)

*Primary Examiner* — Santosh R Poudel
(74) *Attorney, Agent, or Firm* — Harness, Dickey & Pierce, P.L.C.; Anthony G. Fussner

(57) ABSTRACT

An example HVAC system includes an HVAC component, and an HVAC control configured to control the HVAC component according to an HVAC system configuration parameter. The HVAC control includes a controller wireless interface and a memory. The system also includes a mobile device having a user interface and a mobile wireless interface in wireless communication with the controller wireless interface of the HVAC control. The mobile device is configured to display the HVAC system configuration parameter on the user interface, receive user input settings for the HVAC system configuration parameter, and wirelessly transmit the received user input settings to the controller wireless interface of the HVAC control. The HVAC control is configured to store the received user input settings in the memory of the HVAC control to control the HVAC component. Example methods of controlling an HVAC system are also disclosed.

34 Claims, 10 Drawing Sheets

| Set-Up Feature | Set-Up Details | |
|---|---|---|
| Display Orientation | Rotates the Display for Easy Viewing | |
| Error | Displays Current System Errors. | |
| Fault Recall | Displays Stored System Errors. | |
| Quick Set up by OEM | Selects | |
| | Cnnnn (1) | Rzzzz (5) |
| | Gbbbb (2) | Ykkkk (6) |
| | Lxxxx (3) | Nmmmm (7) |
| | Tyyyy (4) | Default (8) |
| Defrost Type | Selects Demand Defrost or Timed Temperature Defrost. | |
| Enable Temperature | Selects Coil Temperature (degrees F) Allowing Timed / Temperature or Demand Defrost to Accumulate Run Time. Above this Temperature a Defrost Cycle will not Occur. | |
| Termination Temperature | Selects Desired Coil Temperature to Terminate Defrost Cycle (degrees F) | |
| Defrost Cycle Time (Timed / Temp Defrost only) | Selects Accumulated Compressor Run Time (minutes) before Entering Defrost Mode. (Appears for Timed Temperature Defrost Systems Only). | |
| Short Cycle Time | Selects Minimum Time Delay (minutes) between Cycles. | |
| Reversing Valve Power | "O" Selection Energizes Reversing Valve in Cool, "B" Energizes Reversing Valve in Heat (B). | |
| Reversing Valve Shift Delay Time | Selection Limits Excessive Noise In and Out of a Defrost Cycle (in seconds). | |

Related U.S. Application Data

(60) Provisional application No. 62/520,771, filed on Jun. 16, 2017.

(51) Int. Cl.
  *H04L 67/125* (2022.01)
  *H04W 4/33* (2018.01)
  *G06V 20/62* (2022.01)

(58) Field of Classification Search
  CPC ....... G06V 20/62; H04L 67/125; H04L 67/12; H04W 4/33; H04W 4/80; H04M 1/72415
  See application file for complete search history.

(56) References Cited

U.S. PATENT DOCUMENTS

| | | | |
|---|---|---|---|
| 6,851,621 B1 | 2/2005 | Wacker | |
| 7,055,759 B2 | 6/2006 | Wacker et al. | |
| 7,575,179 B2 | 8/2009 | Morrow et al. | |
| 8,078,326 B2 | 12/2011 | Harrod et al. | |
| 8,621,377 B2 | 12/2013 | D'Souza et al. | |
| 8,917,045 B2 | 12/2014 | Durfee et al. | |
| 9,412,328 B2 | 8/2016 | Vie et al. | |
| 9,491,242 B2 | 11/2016 | Bomkamp et al. | |
| 2012/0124799 A1 | 5/2012 | Addy | |
| 2013/0158720 A1* | 6/2013 | Zywicki | F24F 11/523 700/276 |
| 2014/0156087 A1 | 6/2014 | Amundson | |
| 2014/0350733 A1 | 11/2014 | Lorenz et al. | |
| 2015/0017913 A1 | 1/2015 | Kuroyama et al. | |
| 2015/0032264 A1* | 1/2015 | Emmons | F24F 11/0001 700/276 |
| 2015/0053780 A1 | 2/2015 | Nelson et al. | |
| 2015/0148963 A1 | 5/2015 | Klein et al. | |
| 2015/0184924 A1 | 7/2015 | Vie et al. | |
| 2016/0147211 A1 | 5/2016 | Kore et al. | |
| 2017/0181254 A1* | 6/2017 | Meitl | G06F 16/23 |
| 2017/0321898 A1* | 11/2017 | Randell | F23N 5/242 |
| 2017/0364106 A1 | 12/2017 | Smith et al. | |
| 2018/0074471 A1* | 3/2018 | Poplawski | F24F 11/62 |
| 2018/0363934 A1 | 12/2018 | Vie et al. | |

* cited by examiner

| OEM | Defrost Type | Defrost Cycle Time | Short Cycle Time | RV Power | RV Shift Delay | Max Defrost Time | Defrost Enable Coil Temp | Defrost Terminate Coil Temp |
|---|---|---|---|---|---|---|---|---|
| C nnnn | T/T | 90 min | 5 min | 0 | 0 sec | 10 min | 30° | 65° |
| G bbbb | T/T | 80 min | 5 min | 0 | 30 sec | 10 min | 35° | 70° |
| Lxxxx | Demand | n/a | 5 min | 0 | 30 sec | 14 min | 35° | 50° |
| Tyyyy | Demand | n/a | 0 min | 0 | 12 sec | 14 min | 35° | 50° |
| Rzzzz | Demand | n/a | 5 min | 8 | 30 sec | 14 min | 35° | 70° |
| Ykkkk | Demand | n/a | 5 min | 0 | 30 sec | 8 min | 31° | 80° |
| Nmmmm | Demand | n/a | 3 min | 0 | 30 sec | 14 min | 35° | 70° |
| Factory Default | Demand | n/a | 5 min | 0 | 30 sec | 14 min | 35° | 70° |

FIG. 3

| Set-Up Feature | Set-Up Details | |
|---|---|---|
| Display Orientation | Rotates the Display for Easy Viewing | |
| Error | Displays Current System Errors. | |
| Fault Recall | Displays Stored System Errors. | |
| Quick Set up by OEM | Selects | |
| | Cnnnn (1) | Rzzzz (5) |
| | Gbbbb (2) | Ykkkk (6) |
| | Lxxxx (3) | Nmmmm (7) |
| | Tyyyy (4) | Default (8) |
| Defrost Type | Selects Demand Defrost or Timed Temperature Defrost. | |
| Enable Temperature | Selects Coil Temperature (degrees F) Allowing Timed / Temperature or Demand Defrost to Accumulate Run Time. Above this Temperature a Defrost Cycle will not Occur. | |
| Termination Temperature | Selects Desired Coil Temperature to Terminate Defrost Cycle (degrees F) | |
| Defrost Cycle Time (Timed / Temp Defrost only) | Selects Accumulated Compressor Run Time (minutes) before Entering Defrost Mode. (Appears for Timed Temperature Defrost Systems Only). | |
| Short Cycle Time | Selects Minimum Time Delay (minutes) between Cycles. | |
| Reversing Valve Power | "O" Selection Energizes Reversing Valve in Cool, "B" Energizes Reversing Valve in Heat (B). | |
| Reversing Valve Shift Delay Time | Selection Limits Excessive Noise In and Out of a Defrost Cycle (in seconds). | |

FIG. 4A

| Set-Up Feature | Set-Up Details |
|---|---|
| Maximum Defrost Time | Selection Limits Maximum Defrost Time (Minutes) |
| Auxiliary Heat Lockout | Settings Allow the Control to Act as an Outdoor Thermostat to Prevent Auxiliary Heat from Coming on Until the Outdoor Temperature Drops to the Selected Temperature (Degrees F). |
| Low Temp Compressor Cutout | Settings Allow the Control to Act as an Outdoor Thermostat to Turn off the Heat Pump and Use Only Auxiliary Heat when it's Too Cold for the Pump to Operate Efficiently (Degrees F). |
| Brownout Random Time Start Delay | "On" Selects a 5 to 90 Second Random Time Start Delay After a Brownout |
| Low Pressure Switch | Accommodates Systems with or without a Low Pressure Switch - if the System Does not Have a Low Pressure Switch to "off" |
| High Pressure Switch | Accommodates Systems with or without a High Pressure Switch - if the System Does not Have a High Pressure Switch to "off" |
| 24V Brownout Protection | "On" Turns Off the Compressor and Fan if Low Voltage Drops Below 15.5VAC. |

FIG. 4B

| | | |
|---|---|---|
| 📶 | 13:52 Settings Connected | ⏰ ✱ 42% 🔋 |

| SYSTEM SETTINGS | |
|---|---|
| Defrost Type | Demand › |
| Reversing Valve Power | 0 › |
| Random Start Delay Time | ⬤ |
| Low Pressure Switch | ⬤ |
| High Pressure Switch | ⬤ |
| 24V Brownout Protection | ⬤ |

| TEMPERATURE SETTINGS | |
|---|---|
| Enable Temperature | 35 F › |
| Termination Temperature | 70 F › |
| Supplemental Heat Lockout | Off › |
| Low Temp Compressor Cutout | Off › |

| TIME SETTINGS | |
|---|---|
| Defrost Cycle Time | N/A |
| Short Cycle Time | 5 Min › |
| Reversing Valve Shift Delay | 30 Sec › |
| Maximum Defrost Cycle | 14 Min › |

| SPECIAL SETTINGS | |
|---|---|
| Display Orientation | Hi › |

| Configure |
|---|

FIG. 5A

| | 13:54 Settings Connected | |
|---|---|---|
| SYSTEM SETTINGS | | |
| Defrost Type | | Demand > |
| Reversing Valve Power | | B > |
| Random Start Delay Time | | ⊙ |
| Low Pressure Switch | | ⊙ |
| High Pressure Switch | | ⊙ |
| 24V Brownout Protection | | ⊙ |
| TEMPERATURE SETTINGS | | |
| Enable Temperature | Status | 32 F > |
| Termination Temperature | Configuration Successful | 60 F > |
| Supplemental Heat | Ok | 15 F > |
| Low Temp Compressor Cutout | | -10 F > |
| TIME SETTINGS | | |
| Defrost Cycle Time | | N/A |
| Short Cycle Time | | 0 Min > |
| Reversing Valve Shift Delay | | 12 Sec > |
| Maximum Defrost Cycle | | 14 Min > |
| SPECIAL SETTINGS | | |
| Display Orientation | | ⊟ > |
| Configure | | |

FIG. 5D

WIRELESSLY CONFIGURING CLIMATE CONTROL SYSTEM CONTROLS

CROSS-REFERENCE TO RELATED APPLICATIONS

This application is a continuation-in-part of U.S. patent application Ser. No. 16/008,817 filed Jun. 14, 2018 (published as US2018/0363934 on Dec. 20, 2018), which, in turn, claims the benefit and priority of U.S. Provisional Application No. 62/520,771 filed Jun. 16, 2017. The entire disclosures of the above applications are incorporated herein by reference.

FIELD

The present disclosure generally relates to wirelessly configuring climate control system controls.

BACKGROUND

This section provides background information related to the present disclosure which is not necessarily prior art.

The operational parameters of a heating, ventilation and air conditioning (HVAC) component (e.g., furnace, air conditioner, heat pump, etc.) may be set by using an HVAC control or controller. In setting the operational parameters, a contractor, installer, or original equipment manufacturer may refer to a display that indicates, e.g., status and fault information.

DRAWINGS

The drawings described herein are for illustrative purposes only of selected embodiments and not all possible implementations, and are not intended to limit the scope of the present disclosure.

FIG. 3 is an example table of original equipment manufacturers (OEMs) of defrost controls and corresponding defrost control parameters for each OEM;

Figure 5B:
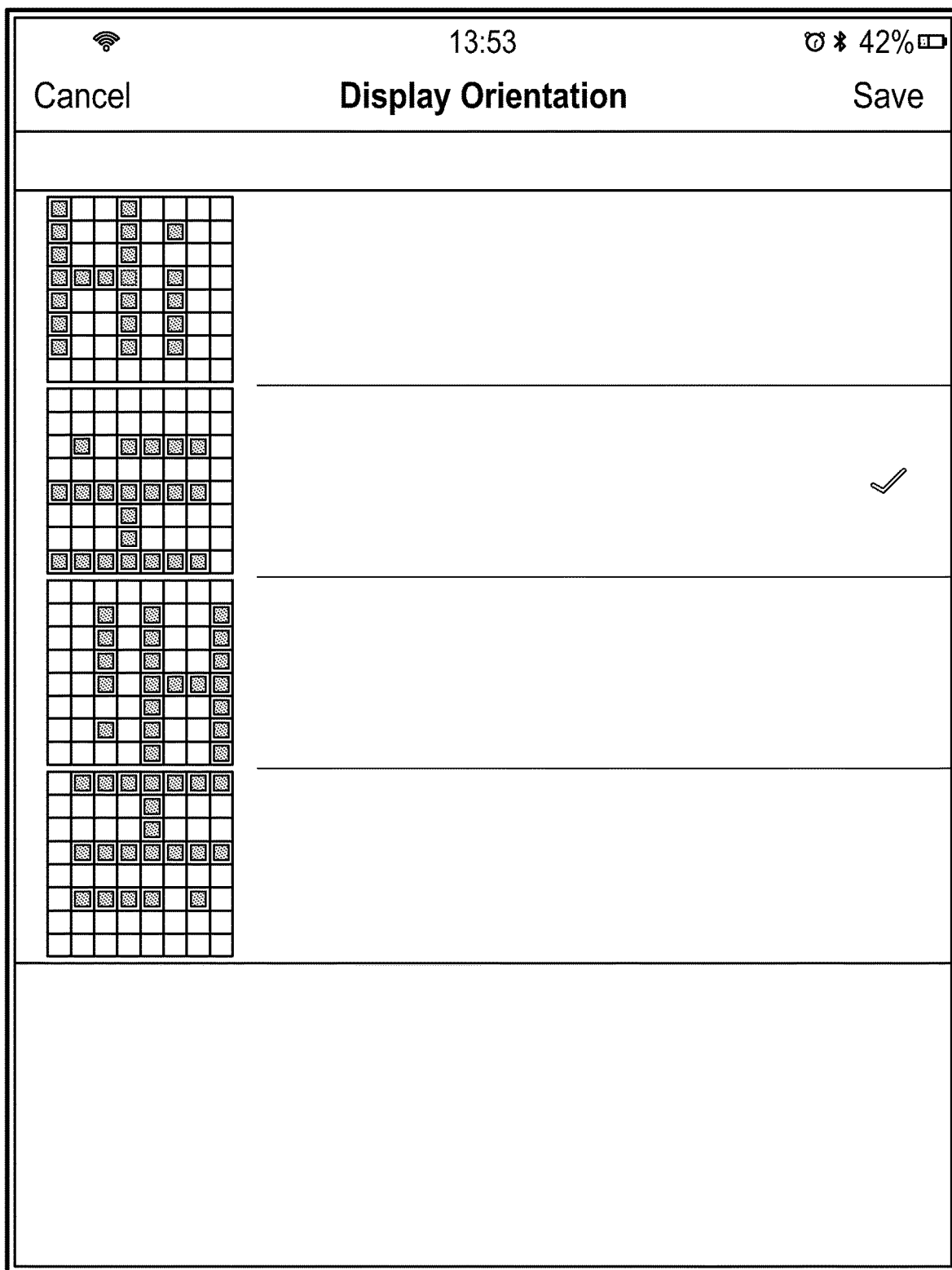
Figure 5C:
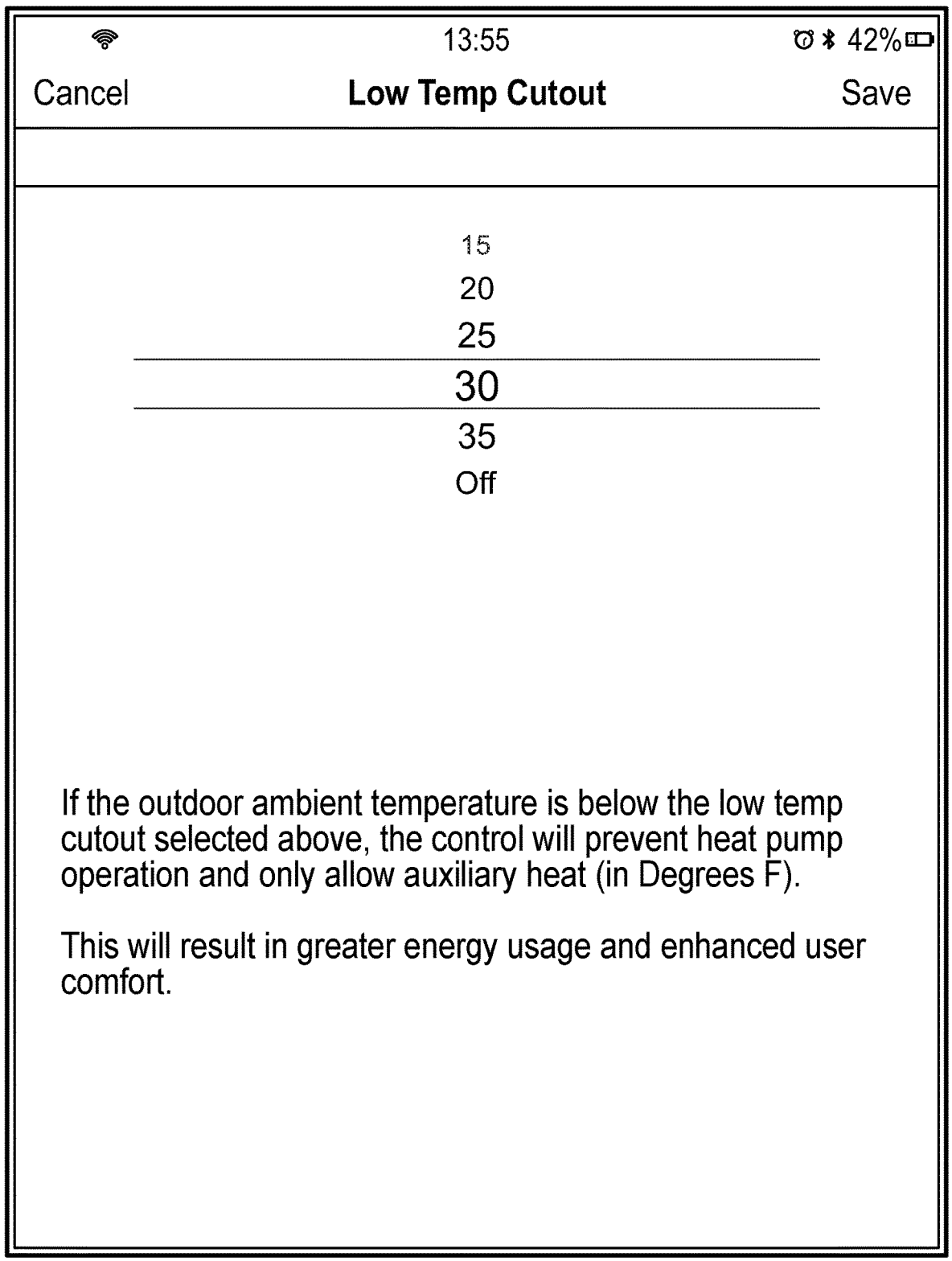
Figure 6:
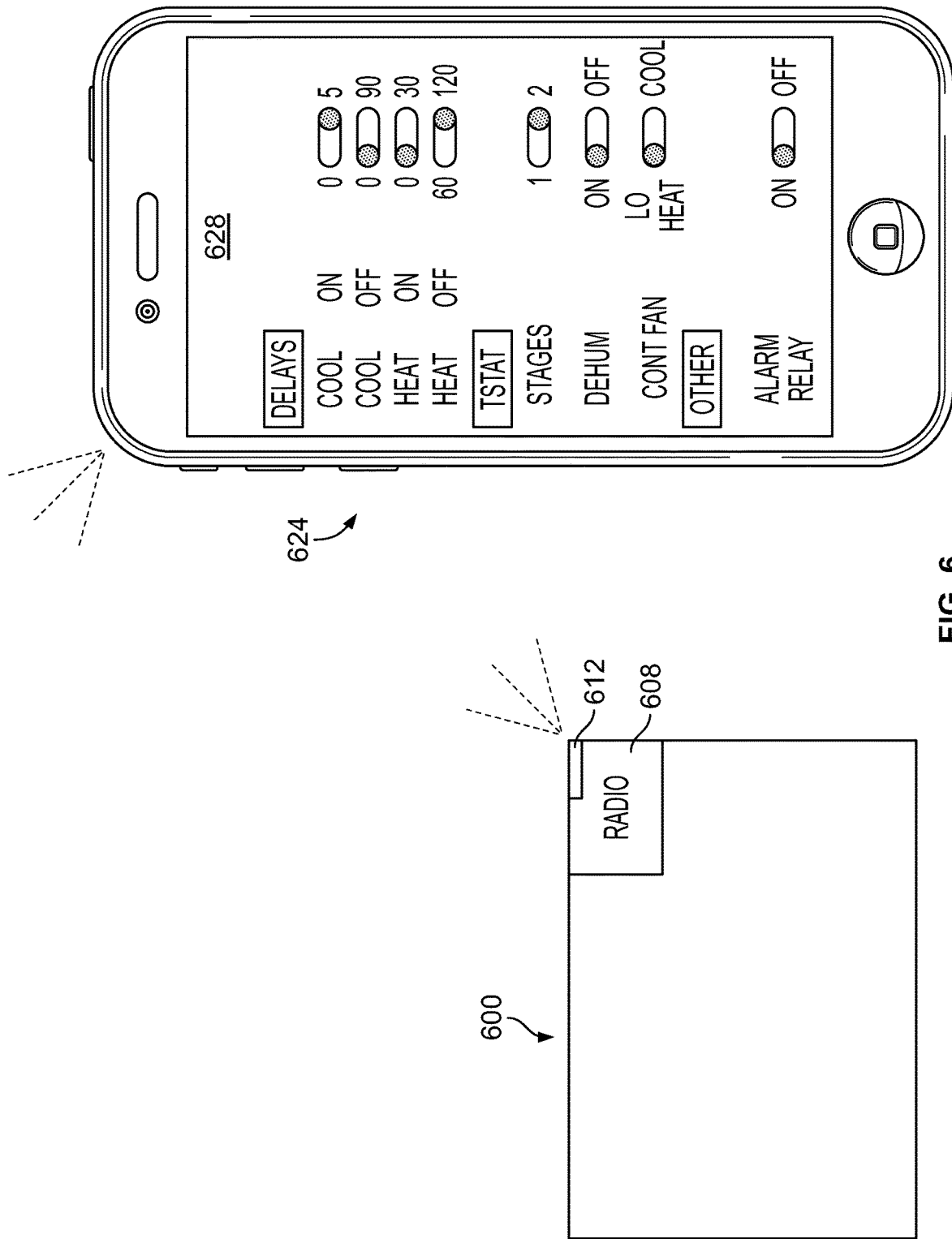

FIGS. 4A and 4B describe example defrost control set-up features that may be provided wirelessly to a mobile device as menu choices in accordance with various implementations of the disclosure;

FIGS. 5A, 5B, 5C, and 5D are screenshots of selectable menu items and information displayed in accordance with one example embodiment of the disclosure; and FIG. 6 is a diagram of an example integrated furnace control (IFC) and a user mobile device configured to provide setup parameters to the IFC in accordance with an example implementation of the disclosure.

Corresponding reference numerals indicate corresponding (although not necessarily identical) parts throughout the several views of the drawings.

DETAILED DESCRIPTION

Example embodiments will now be described more fully with reference to the accompanying drawings.

The inventors hereof have recognized that control boards for HVAC controls for HVAC equipment, units, systems, etc., including but not limited to furnaces, heat pumps and air handlers, are becoming increasingly complex. Conventional furnace, heat pump and air handler units typically have to be opened up in order to access control boards, to access fault and/or operational data, and/or to change configuration settings. It can be difficult for a service technician or other user to configure HVAC controls via dipswitches, push buttons and/or LEDs, which can be difficult for the user to read, understand and execute correctly, particularly in dark and confined spaces that can be very hot or very cold. Blinking LED fault codes can be misread and misinterpreted.

Further, for units in need of replacement HVAC controls, it often can be difficult to configure a replacement for a control that has a large number of options. A large number of possible options also can make it difficult to provide a universal control for such units. Many conventional interfaces for installing replacement HVAC controls require an installer to understand the settings of an old control and to manually set them for a replacement control.

Accordingly, the inventors have developed and disclose herein exemplary embodiments of an HVAC control having a power supply and a short-range wireless communication interface (e.g., BLUETOOTH (BT), Near Field Communication (NFC), etc.) or other radio communication interface, which may be integrated into a circuit board of the control. In various embodiments, an installer may use a software application on a smart phone or other mobile computing device to configure such a control. In some embodiments, the HVAC control radio communication interface is connectable with a BT or other radio communication interface of an installer's mobile device.

A series of menu items may be provided to the installer, who may follow the menu items to install the HVAC control. In various embodiments, a software application menu may list a plurality of HVAC control types that could be configured using the software application, and a user may select from the menu a type of control to configure.

Additionally or alternatively, when a software application on a user's mobile device has been connected with a control via BT or other radio communication interface, the software application may query the HVAC control as to its type and thereafter automatically present the appropriate control configuration menu to the user on the mobile device. In embodiments in which a control is to be configured as a replacement for an existing control, a software application on a user mobile device may query the existing control to extract its programmable parameters, pre-populate selection criteria in the application with the extracted parameters, and download the selections to the replacement control.

In some embodiments, a user may enter, e.g., by typing and/or by voice command, a type and number for a particular HVAC control (which may be new or a replacement) into a software application on the user's mobile device, after which the application contacts a remote server to obtain parameter selection criteria for the user-identified control. The server may fetch the parameter selection information from a database and send the values to the application for download to the control.

Thus, in various embodiments, all configurable parameters may be automatically selected, and in the case of a new control, the installer or other user may modify one or more parameters based, e.g., on installation specifics. As one example, an installer might adjust a parameter for the speed of a circulator, to suit the total duct length at an installation site.

In various embodiments in which a replacement control is to be installed, a user may enter, e.g., by typing and/or by voice command, a part number of the old control into a software application on a smart phone. Additionally or alternatively, the user may use the phone to take a picture of a label of the old control. The software application may thereby recognize the old control automatically and access the default setting(s) for the old control. This could be done also in relation to a product label and/or in relation to other part(s) of the system, e.g., to optimize most if not all settings.

Characters from a label could be recognized, and/or identifying information could be retrieved, e.g., from a bar code label, typed in or selected from a list, etc. The software application could use such label information, e.g., to query "the cloud" to retrieve default settings for the old control and automatically configure the default settings as selected settings for the replacement control. The installer may accept the default settings if desired, and/or make any desired changes via the application to the settings, e.g., before the settings are loaded into the new replacement control.

In some embodiments, actual settings of a new control may be stored based, e.g., on the location or address or serial number, as the new control is configured and installed. Such information could be saved for future use. In various embodiments, an installer may be directed graphically, e.g., by an application on the installer's phone, which could "walk" the installer through decision points in an installation process and let the installer decide each step.

A first step might be, e.g., for the installer to: (a) type, speak, or otherwise enter into the application, control/product information for an existing control that is to be replaced, (b) take a picture of the label of the existing control, or (c) skip to a following step. The following step might be for the installer to make a selection of what the existing control is to be replaced with. In various embodiments, the application might suggest a replacement control and provide a replacement control number.

The application may also suggest other or additional system part number(s)/control number(s) and/or parameters. The installer may accept defaults and/or change them. In various embodiments, the application may store default settings for a wireless-enabled control in the cloud, on a remote server, etc., so that when the control is replaced, the exact defaults can be loaded into the new control.

It should be noted generally that although embodiments are described herein with reference to universal HVAC controllers, embodiments are also contemplated in relation to non-universal controllers. It also should be noted that unless otherwise indicated, terms such as "configuration," "set-up," "installation," "configuring," "setting up" and "installing" may be used interchangeably herein. Embodiments are contemplated relative to various parameters, commands, settings, etc., whereby climate control system controls may be operated and/or made operable.

Figure 1:
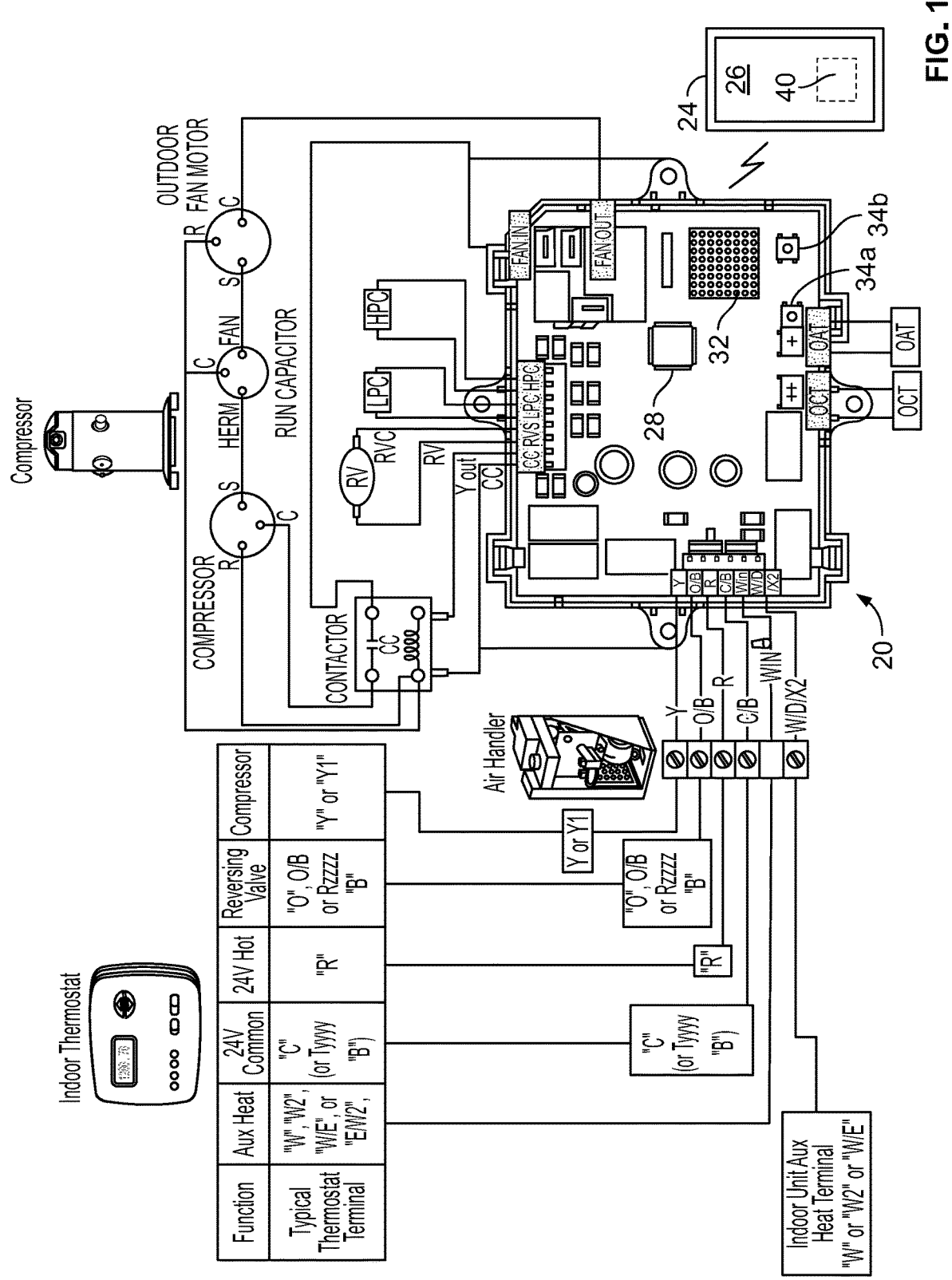
FIG. 1 illustrates a universal heat pump defrost control and a mobile device, each configured in accordance with one example embodiment of the disclosure.

With reference now to the figures, FIG. 1 illustrates an exemplary embodiment of an example universal heat pump defrost control 20 embodying one or more aspects of the present disclosure. The universal defrost control 20 may be used, e.g., as replacement for any one of a plurality of different defrost controls made by different manufacturers and that have different set-up parameters. Typically, after a defrost control has been wired into a climate control system, the installer determines which setup parameters to apply in the defrost control.

The defrost control 20 includes a microcontroller 28, which in the present example embodiment is a PIC24F-type microcontroller. The defrost control 20 also includes a display device 32, which in the present example embodiment is a dot matrix LED display controlled by the microcontroller 28. An "option" push button 34a and a "select" push button 34b may be used for selecting a menu on the LED display 32 and then setting or adjusting operational parameters for the selected menu.

Additionally or alternatively, the LED display 32 and push buttons 34a-34b may be used for recalling a fault. In various embodiments of the present disclosure, however, an installer may additionally or alternatively use a software application to make such determinations and to push appropriate setup parameters to the defrost control 20. For example, the defrost control 20 is wirelessly connectable with a mobile computing device 24, e.g., a smart phone, tablet, laptop, etc., (hereinafter referred to as "mobile device.") The mobile device 24 has a processor and memory 40 that includes and/or has access to a software application executable to configure the defrost control 20, e.g., as further described below. The mobile device 24 also has a display, e.g., a touchscreen 26, and, in various embodiments, a voice processing capability.

Figure 2:
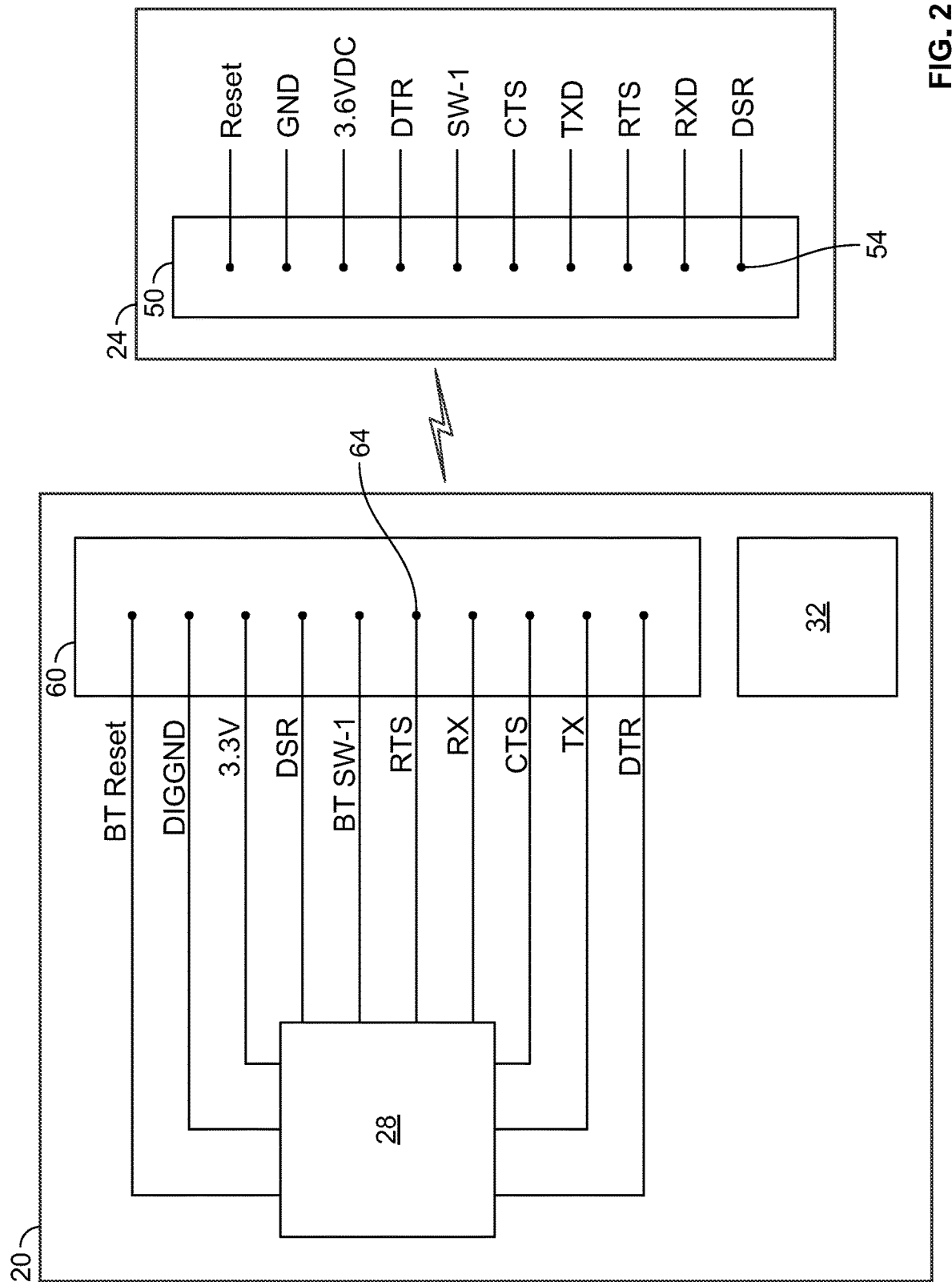
FIG. 2 is a diagram of selected components of a universal heat pump defrost control and a mobile device, each configured in accordance with one example embodiment of the disclosure.

As shown in FIG. 2, the example defrost control 20 and mobile device 24 are both Bluetooth-enabled and may communicate with each other, e.g., via BLE (Bluetooth Low Energy) communication interfaces. The example mobile device 24 includes a Bluetooth module 50 having J6 connections 54.

In the present example embodiment, the connections 54 may provide the following functionalities. "Reset" enables the Bluetooth module 50 in the mobile device 24 to be reset. "GND" and "3-6 VDC" connect respectively to grounding and power provided in the mobile device 24. "DTR" may be activated to send a "data terminal ready" signal. "SW-1" is for enabling/disabling Bluetooth connectivity. "CTS" may be activated to send a "clear to send" signal. "TxD" may be activated to send a "transmitted data" signal. "RTS" may be activated to send a "request to send" signal. "RxD" may be activated to send a "received data" signal. "DSR" may be activated to send a "data set ready" signal.

The example defrost control 20 includes a Bluetooth interface 60 having connections 64 that correspond to the mobile device 24 connections 54. Thus, for example, data sent wirelessly by the mobile device 24 via the "TxD" pin of the Bluetooth module 50 may be received by the microcontroller 28 via the "Rx" pin of the Bluetooth interface 60, and data sent wirelessly by the microcontroller 28 of the defrost control 20 via the "Tx" pin of the Bluetooth interface 60 may be received by the mobile device 24 via the "RxD" pin of the Bluetooth module 50. The "DIGGND" and "3.3V" connections provide the Bluetooth interface 60 with power from power circuits (not shown) of the defrost control 20. The "BT Reset" of the interface 60 may be connected to a switch, e.g., to a momentary pushbutton (not shown) and activated to perform a hardware reset of the interface 60.

In some embodiments, the reset capability may be used in a pairing process between the defrost control 20 and the mobile device 24. For example, a user may push a reset button on the defrost control 20 to reset the entire control. As the control 20 powers back up, it may start the Bluetooth radio in pairing mode. The software application, which is running at the same time, may acknowledge the pairing request when the user uses the mobile device 24 to activate the acknowledgement. The application and the mobile device 24 thus would be paired to the control 20.

The user then may configure the control 20 using the software application and Bluetooth connection. In some embodiments, a pairing button or other switch may be provided on the control 20 instead of a reset switch. The example Bluetooth interface 60 is an OBS421 module, manufactured by ublox AB, which includes a microprocessor and radio. It should be noted, however, that although the Bluetooth interface 60 is shown in FIG. 2 as an integral Bluetooth module, various components could be integrated into a control in various ways to provide a Bluetooth and/or other radio interface.

In various embodiments, an installer may use the software application on the mobile device 24 to configure the universal defrost control 20 for operation in a particular climate control system. In some embodiments, the software application displays, on the mobile device touchscreen 26, a main menu having an item for "manufacturer selection." Additionally or alternatively, the software application may provide menu items audibly, from the mobile device 24 to an installer.

In the present example embodiment, the installer may select the "manufacturer selection" menu item to display a list of manufacturers (OEMs) that provide a defrost control as part of their equipment lineup. The installer may use the touchscreen 26 to select one of the manufacturers, e.g., by touching one of the OEM names displayed in the list, or by using a voice command, to transmit a selection of one of the manufacturers to the software application on the mobile device 24. In response to the installer's OEM selection, the software application may transmit parameter values corresponding to the selected OEM to the microcontroller 28 for populating parameters of the universal defrost control 20.

FIG. 3 illustrates an example list of OEMs 300 and corresponding defrost control parameters 308 for each OEM. Under "Defrost Type", "T/T" means time/temperature. When T/T defrosting is performed, an outdoor unit runs a fixed number of minutes in heat pump mode, then performs a defrost cycle, and then returns to heat pump mode. "Demand" is a defrost method in which the unit only performs a defrost cycle when it is needed. This is typically done using two temperature sensors, one on the coil, the other sensing the outdoor temperature.

Referring to FIG. 1, for example, the universal defrost control 20 receives sensor input from a coil temperature sensor OCT and an outdoor ambient temperature sensor OAT. When the difference, during operation, of the coil temperature and the outdoor temperature exceeds a given value, e.g., 10° F., the unit performs a defrost cycle. This method works on the principle that frost forms an insulating barrier to the heat exchanger, and alters the typical delta between the coil and outdoor temperature.

In various embodiments, a software application on a mobile device is configured to assist an installer by displaying, speaking, and/or otherwise providing information pertinent, e.g., to selectable parameters. Additionally or alternatively, a software application on a mobile device may be configured to receive voice commands from an installer requesting and/or providing information to the software application. In various embodiments, a plurality of menu choices and submenu values may be provided on the touchscreen 26 for selection therefrom by the installer. The installer may use such menus to configure a defrost control "manually," i.e., without using parameters as may be automatically provided for a given OEM.

Additionally or alternatively, the installer may select from such menus in order to make adjustments to certain parameters. Example set-up features that may be provided as menu choices are listed and described in FIGS. 4A and 4B. An example main menu screen, shown in FIG. 5A, includes most of the set-up parameters of FIGS. 4A and 4B. As shown in FIG. 5A, parameters are characterized as "System Settings", "Temperature Settings", "Time Settings", and "Special Settings".

In various embodiments, the software application allows a given menu item to be selectable only if it is consistent with setting(s) previously selected by the installer. For example, because the first setting selection, "Defrost Type", has been set to "Demand", a setting applicable only to "T/T" defrost is not available for selection by the installer. Thus a "Time Settings" menu item for "Defrost Cycle Time" is set to "N/A". In this way, the installer may be guided to select only parameters as appropriate for the control being configured.

If the installer selects "Display Orientation" on the main menu, a display orientation selection screen is displayed, e.g., as shown in FIG. 5B. The installer then may select an orientation for displays on the defrost control LED display 32. Generally, a display can be difficult to read when the orientation of equipment holding the display is changed. For example, many furnaces can be installed up-flow, down-flow, or horizontally and may be field-convertible. As shown in FIG. 5B, the installer may select from four different orientations of the LED display 32, e.g., by touching the selected orientation on the touchscreen 26. The installer thus may change the orientation from the upright "Hi" orientation (shown in FIG. 5A as the current orientation) to one of the other three orientations if desired.

In various embodiments, the software application is configured to assist an installer by displaying information pertinent to selectable parameters. For example, if an installer selects "Low Temp Compressor Cutout" from the main menu of FIG. 5A, a selection screen may be displayed, e.g., as shown in FIG. 5C. A range of low temperatures is displayed from which the installer may select an outdoor temperature at which heat pump operation is prevented. In addition to the low temperature range, the selection screen of FIG. 5C displays a description of how the "Low Temp Compressor Cutout" parameter is used by the defrost control 20, and the impact of that selection.

For example, FIG. 5C illustrates that the installer selected 30 degrees Fahrenheit (° F.) from the range of possible temperature selections from 15° F. to 35° F. (in 5° F. increments). Also by way of example, the selection screen shown in FIG. 5C includes the following: "If the outdoor ambient temperature is below the low temp cutout selected above, the control will prevent heat pump operation and only allow auxiliary heat (in Degrees F.). This will result in greater energy usage and enhanced user comfort." Accordingly, FIG. 5C illustrates an example of how the selection screen may display a description of how the "Low Temp Compressor Cutout" parameter is used by the defrost control 20 and the impact of that selection.

As another example, a range of temperatures may be displayed from which the installer may select a defrost termination temperature. The different available selections for the defrost termination temperature include 50° F., 60° F., 65° F., 70° F., 75° F., 80° F., 90° F., and 100° F., wherein 70° F. is a default setting. The defrost termination temperature may be defined as the coil temperature used to terminate a defrost cycle, wherein the goal is the ensure a completely clear coil before ending the defrost cycle. In this example, an explanation of the impacts of making different defrost termination temperature selections may include that higher temperature values will generally result in a longer defrost cycle, which, in turn, will result in increased energy usage as backup heat (gas or electric) will be used. The explanation may also include suggestions, such as one or more of:

if the heat pump is not installed on snow legs or otherwise elevated off the ground, a higher value may be necessary;

if the heat pump is installed in an area with windy conditions, a higher value may be necessary;

if the heat pump is installed in a geographical area where high humidity and icing can be expected, a higher value may be necessary; and the lowest value that will typically result in a clear coil after defrost will yield the greatest system efficiency.

In exemplary embodiments, the user interface of a mobile device is configured to allow the installer (broadly, a user) to access the explanation of the impacts of making different available defrost termination temperature selections before the installer makes a specific selection from the different available defrost termination temperature selections.

When the installer has completed parameter selection, the installer may touch "Configure" on the main menu screen, to instruct the software application to wirelessly push the selected parameters to the defrost control 20. A status screen may then be displayed, e.g., as shown in FIG. 5D. In various embodiments, if configuration was not successful, the software application may communicate with the defrost control microcontroller 28 to determine and display any errors.

Another example embodiment of a control is shown in FIG. 6. An example integrated furnace control ("IFC") 600 includes a microprocessor with memory, a radio 608, and an antenna 612 configured for wireless communication, e.g., via Bluetooth LE, with a mobile device 624, e.g., a phone or tablet having a display screen 628. On the mobile device display screen 628 is displayed an example menu of heating and cooling delays, thermostat settings, and other settings, such as an alarm relay setting. The various settings are selectable, e.g., by an installer of the IFC 600.

In another example embodiment, an HVAC system includes at least one HVAC component, and an HVAC control configured to control the at least one HVAC component according to one or more HVAC system configuration parameters. The HVAC control includes a controller wireless interface and a memory. The system also includes a mobile device having a user interface and a mobile wireless interface in wireless communication with the controller wireless interface of the HVAC control.

The mobile device is configured to display the one or more HVAC system configuration parameters on the user interface, receive user input settings for the one or more HVAC system configuration parameters, and wirelessly transmit the received user input settings for the one or more HVAC system configuration parameters to the controller wireless interface of the HVAC control.

The HVAC control is configured to store the received user input settings for the one or more HVAC system configuration parameters in the memory of the HVAC control to control the at least one HVAC component according to the received user input settings for the one or more HVAC system configuration parameters.

In some cases, the HVAC control includes a control board and the controller wireless interface includes a short-range wireless communication interface (e.g., BLUETOOTH). The mobile device may include a mobile phone, a tablet computer, etc. The user interface of the mobile device may be configured to display selection information corresponding to each of the one or more HVAC system configuration parameters indicative of effects of different selection options for said HVAC system configuration parameters on performance of the HVAC system.

The user interface of the mobile device may be configured to receive at least one of an installation date, a location and an installer name. In that case, the mobile device is configured to wireless transmit the received at least one of an installation date, a location and an installer name to the controller wireless interface of the HVAC control, and the HVAC control is configured to store the received at least one of an installation date, a location and an installer name in the memory.

The HVAC system may include at least one of a wireless air temperature sensor, a wireless coil temperature sensor and a wireless humidity sensor, and the mobile device can be configured to wirelessly transmit one or more setting parameters of the wireless air temperature sensor, the wireless coil temperature sensor and/or the wireless humidity sensor to the controller wireless interface of the HVAC control. In some cases, the mobile device is configured to wirelessly transmit a software update to the controller wireless interface of the HVAC control, and the HVAC control is configured to store the received software update in memory.

In some embodiments, the HVAC control is configured to wirelessly transmit at least one of a fault code and operational data to the mobile wireless interface of the mobile device, and the mobile device is configured to display the received fault code and/or operational data on the user interface. For example, the operational data may include, but is not limited to, flame sense readings over time, air temperature readings over time, coil temperature readings over time, a defrost cycle, a serial number, a model number, an installation date, runtime data, a geographical location, etc.

The mobile device may be configured to determine a model number identifier of the HVAC control and to display installation information corresponding to the HVAC control in response to the determined model number identifier of the HVAC control. In some cases, the HVAC control is configured to wirelessly transmit settings of the one or more HVAC system configuration parameters that are currently stored in the memory of the HVAC control to the mobile wireless interface of the mobile device.

According to another example embodiment of the present disclosure, an HVAC system includes at least one HVAC component, and an HVAC control configured to control the at least one HVAC component according to one or more HVAC system configuration parameters. The HVAC control includes a controller wireless interface and a memory.

The HVAC system also includes a mobile device having a user interface, a camera, and a mobile wireless interface configured for wireless communication with the controller wireless interface of the HVAC control. The mobile device is configured to obtain an identity of the HVAC control which identity is determined by parsing an image of a label of the HVAC control as captured by the camera or by receiving a model number of the HVAC control entered into the user interface.

For example, the mobile device may be configured to determine the identity of the HVAC control by the mobile device parsing the image of the label of the HVAC control as captured by the camera or by the mobile device receiving the model number of the HVAC control entered into the user interface. Alternatively, or in addition, a remote device (e.g., a remote server) could determine the identity of the HVAC control, etc.

The mobile device is also configured to cause default settings for the one or more HVAC system configuration parameters from a remote server based on the identified HVAC control to be wirelessly transmitted to the controller wireless interface of the HVAC control.

For example, the mobile device may be configured to obtain the default settings for the one or more HVAC system configuration parameters from the remote server based on the identified HVAC control, and wirelessly transmit the settings for the one or more HVAC system configuration parameters to the controller wireless interface of the HVAC control. Alternatively, or in addition, a remote device (e.g., a remote server) could wirelessly transmit the settings to the HVAC control, etc.

The HVAC control is configured to store the received settings for the one or more HVAC system configuration parameters in the memory of the HVAC control to control the at least one HVAC component according to the received settings for the one or more HVAC system configuration parameters.

In this example embodiment, the label may include at least one of a product label of the HVAC control and a barcode label of the HVAC control, and the mobile device may be configured to parse the image by recognizing characters in the product label and/or the barcode label. Alternatively, or additionally, the mobile device may be configured to receive the model number of the HVAC control by displaying a list of possible HVAC control model numbers and receiving a user selection from the displayed list.

In some cases, the mobile device is configured to display the received default settings from the remote server on the user interface of the mobile device, receive adjustments to the default settings via user input at the user interface, and wirelessly transmit the adjusted settings to the controller wireless interface of the HVAC control. In that case, the mobile device may be configured to save the adjusted settings along with at least one of a location, and address and a serial number of the HVAC control. The mobile device may be configured to determine a suggested replacement HVAC control based on the identified HVAC control, and display the suggested replacement HVAC control on the user interface.

According to another example embodiment of the present disclosure, a method of controlling an HVAC system including an HVAC component is disclosed. The method includes controlling, by the HVAC control, the at least one HVAC component according to one or more HVAC system configuration parameters, displaying the one or more HVAC system configuration parameters on a user interface of the mobile device and receiving, via the user interface, user input settings for the one or more HVAC system configuration parameters.

The method also includes wirelessly transmitting the received user input settings for the one or more HVAC system configuration parameters from the mobile device to a controller wireless interface of the HVAC control, and storing the received user input settings for the one or more HVAC system configuration parameters in a memory of the HVAC control to control the at least one HVAC component according to the received user input settings for the one or more HVAC system configuration parameters.

In some embodiments, the method may include identifying, by the mobile device, the HVAC control by parsing an image of a label of the HVAC control as captured by a camera on the mobile device, or by receiving a model number of the HVAC control entered into the user interface, and obtaining default settings for the one or more HVAC system configuration parameters from a remote server based on the identified HVAC control.

According to another example embodiment, an HVAC control includes a control interface in communication with at least one HVAC component to control the at least one HVAC system according to one or more HVAC system configuration parameters, a controller wireless interface configured for wireless communication with a mobile wireless interface of a mobile device, and a memory.

The HVAC control is configured to wirelessly receive user input settings for the one or more HVAC system configuration parameters from the mobile device via the controller wireless interface of the HVAC control. The HVAC control is also configured to store the received user input settings for the one or more HVAC system configuration parameters in the memory of the HVAC control to control the at least one HVAC component according to the received user input settings for the one or more HVAC system configuration parameters.

Example HVAC controls and mobile devices described herein may be configured to perform operations using any suitable combination of hardware and software. For example, the HVAC controls and mobile devices may include any suitable circuitry, logic gates, microprocessor(s), computer-executable instructions stored in memory, etc., operable to cause the HVAC controls and mobile devices to perform actions described herein (e.g., controlling an HVAC component, wirelessly transmitting settings, etc.).

In various embodiments in which an installer's mobile device includes voice processing capability, an installer may issue voice commands to the mobile device. In some embodiments, a software application on the mobile device processes a voice command from the installer and transmits a corresponding digital command wirelessly to a climate control system control.

The control may wirelessly transmit a response to the software application, in which case the software application provides a corresponding voice response to the installer on the mobile device. Thus, for example, an installer may issue voice commands via a smart phone to an IFC to set up and configure the IFC, to troubleshoot, and/or to obtain diagnostics regarding the IFC. The installer may speak into the smart phone, e.g., to ask, "What is the flame sense reading?" and the IFC may wirelessly transmit a response, e.g., "0.2 micro Amps," which is spoken to the installer by the smart phone. As another example, an installer may issue a voice command to an IFC to turn on the circulator for a test. The installer thus is provided with a convenient way to test the circulator, without having to open up the unit and use a jumper wire.

As still another example, an installer could issue a voice command to a heat pump defrost control to "run a forced defrost." Generally, it should be understood that the processing of mobile device commands and/or climate control system control responses (whether given by voice or otherwise) could be distributed in various ways, e.g., between a given mobile device and a given climate control system control.

Embodiments of the disclosure can facilitate an installer's configuration of controls. Installation can take less time and can be less error-prone than when installation is performed manually. Rather than having to set multiple dipswitches, or navigating through a long menu that uses LEDs and push buttons, an installer can configure all necessary settings using a software application, and then push the data to the control. The software application can provide more detail on available configuration selections to help a service technician make better choices.

For example, before a user chooses a defrost enable temperature, the user may access an explanation by the software application of the impact(s) of making different available selections. See, for example, FIG. 5C. Wireless alarms and sensors for air temperature, col temperature, humidity, etc., and more, could be easily added, in contrast to the difficulty or impossibility of adding alarms and/or system sensors where hard wiring is a requirement. Installation date, location, installer name, and other data could be loaded to the control for future warranty tracking and analysis.

Various embodiments can provide advantages relating to control servicing. For example, software updates could be pushed to the control in the field and/or remotely. Fault codes and/or other operational data could be received from the control without having to open up the unit. This may reduce (e.g., eliminate) miscounting of the blinks of an LED. Fault codes can include information on the basic system items to check out for any given code, like an embedded fault tree.

System data could be logged and sent to the application on the mobile device for analysis during a service call. Examples might be flame sense readings over time, air and coil temperature readings over time or during an event, such as a defrost cycle. A service technician could work in a comfortable space to do the necessary configuration work, e.g., before going to the unit for upload. For example, the technician would not have to stand outside on a 10-degree day while configuring a new universal heat pump control. Software application embodiments can also provide much of the data typically found in a printed installation manual, e.g., once the individual control is identified by its model number.

Various embodiments can provide advantages relating to control replacement. For example, an original equipment manufacturer (OEM) of a given control can add items to be configured on the control, without worrying that the control might become too complex for an average service technician to work on.

In various embodiments, configuration settings from the existing control can be uploaded and transferred to the replacement control. Unit serial number, model number, installation dates, installer name, lifetime heating/cooling/defrost/other cycles, runtime data, geographical location and more could be pulled from the control for improved warranty reporting and analysis. Warranty-supporting information is often unavailable for many existing controls, since there typically is no way to upload such information to the controls. Unlike most standard controls, software on the foregoing control embodiments can be updated in the field, if needed. Supporting documentation for a given control embodiment can be stored, instead of becoming lost or unreadable over time from age.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9,1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   an HVAC control configured to control at least one HVAC component according to one or more HVAC system configuration parameters, the HVAC control including a controller wireless interface and a memory; and
   a mobile device including a user interface and a mobile wireless interface;
   wherein:
   the mobile device is configured to display the one or more HVAC system configuration parameters on the user interface, receive user input settings for the one or more HVAC system configuration parameters, and wirelessly transmit the received user input settings for the one or more HVAC system configuration parameters to the controller wireless interface of the HVAC control;
   the HVAC control is configured to store the received user input settings for the one or more HVAC system configuration parameters in the memory of the HVAC control to control the at least one HVAC component according to the received user input settings for the one or more HVAC system configuration parameters; and
   the user interface of the mobile device is configured to allow a user to access an explanation of the impacts of making different available selections before the user chooses a defrost enable temperature.

2. The system of claim 1, wherein the mobile device is configured to determine a model number identifier of the HVAC control by parsing an image of a label of the HVAC control as captured by a camera, or by the mobile device receiving the model number identifier of the HVAC control entered into the user interface, or by the HVAC control wirelessly transmitting the model number identifier of the HVAC control to the mobile wireless interface of the mobile device.

3. The system of claim 1, wherein the received user input settings stored in the memory of the HVAC control are retrievable via the mobile device and usable as default settings for a replacement HVAC control, which default settings are selectable, modifiable, and downloadable via the mobile device to the replacement HVAC control.

4. The system of claim 1, wherein the received user input settings stored in the memory of the HVAC control are retrievable directly from the memory of the HVAC control via the mobile device and downloadable as default settings directly to a replacement HVAC control via the mobile device, which default settings are selectable, modifiable, and downloadable via the mobile device.

5. The system of claim 1, wherein the received user input settings stored in the memory of the HVAC control are retrievable directly from the memory of the HVAC control via the mobile device and downloadable as default settings directly to a replacement HVAC control from the memory of the HVAC control via the mobile device, which default settings are automatically configured as selected settings for the replacement HVAC control that are selectable, modifiable, and downloadable via the mobile device.

6. The system of claim 1, wherein:
   the mobile device is configured to determine a model number identifier of the HVAC control; and
   the mobile device is configured to display installation information corresponding to the HVAC control in response to the determined model number identifier of the HVAC control.

7. The system of claim 1, wherein:
   the mobile device is configured to determine a model number identifier of the HVAC control; and
   the mobile device is configured to determine a suggested replacement HVAC control based on the determined model number identifier of the HVAC control and to display the suggested replacement HVAC control on the user interface.

8. The system of claim 1, wherein the received user input settings are retrievable directly from the memory of the HVAC control via the mobile device without retrieving the received user input settings from a remote server or the cloud.

9. The system of claim 1, wherein the HVAC control includes a control board and the controller wireless interface includes a short-range wireless communication interface.

10. The system of claim 9, wherein the short-range wireless communication interface includes a BLUETOOTH short-range wireless communication interface and/or Near Field Communication (NFC) short-range wireless communication interface.

11. The system of claim 1, wherein the mobile device includes at least one of a mobile phone and a tablet computer.

12. The system of claim 1, wherein:
the user interface of the mobile device is configured to receive at least one of an installation date, a location, and an installer name;
the mobile device is configured to wireless transmit the received at least one of an installation date, a location, and an installer name to the controller wireless interface of the HVAC control; and
the HVAC control is configured to store the received at least one of an installation date, a location, and an installer name in the memory.

13. The system of claim 1, further comprising at least one of a wireless air temperature sensor, a wireless coil temperature sensor, and a wireless humidity sensor, wherein the mobile device is configured to wirelessly transmit one or more setting parameters of the wireless air temperature sensor, the wireless coil temperature sensor, and/or the wireless humidity sensor to the controller wireless interface of the HVAC control.

14. The system of claim 1, wherein the mobile device is configured to wireless transmit a software update to the controller wireless interface of the HVAC control, and the HVAC control is configured to store the received software update in memory.

15. The system of claim 1, wherein the HVAC control is configured to wirelessly transmit at least one of a fault code and operational data to the mobile wireless interface of the mobile device, and the mobile device is configured to display the received fault code and/or operational data on the user interface.

16. The system of claim 15, wherein the at least one of the fault code and the operation data are retrievable from the HVAC control without having to manually open the HVAC control and/or without having to count blinks of an LED of the HVAC control.

17. The system of claim 15, wherein the operational data includes at least one of flame sense readings over time, air temperature readings over time, coil temperature readings over time, a defrost cycle, a serial number, a model number, an installation date, runtime data, and a geographical location.

18. The system of claim 1, wherein the HVAC control is configured to wireless transmit settings of the one or more HVAC system configuration parameters that are currently stored in the memory of the HVAC control to the mobile wireless interface of the mobile device.

19. The system of claim 1, wherein:
the mobile device is configured to determine a model number identifier of the HVAC control by parsing an image of a label of the HVAC control as captured by a camera;
the label includes at least one of a product label of the HVAC control and a barcode label of the HVAC control; and
the mobile device is configured to parse the image by recognizing characters in the product label and/or the barcode label.

20. A system comprising:
an HVAC control configured to control at least one HVAC component according to one or more HVAC system configuration parameters, the HVAC control including a controller wireless interface and a memory; and
a mobile device including a user interface and a mobile wireless interface;
wherein:
the mobile device is configured to cause default settings for the one or more HVAC system configuration parameters from a remote server based on an identifier of the HVAC control to be wirelessly transmitted to the controller wireless interface of the HVAC control;
the HVAC control is configured to store the received settings for the one or more HVAC system configuration parameters in the memory of the HVAC control to control the at least one HVAC component according to the received settings for the one or more HVAC system configuration parameters; and
the user interface of the mobile device is configured to allow a user to access an explanation of the impacts of making different available selections before the user chooses a defrost enable temperature.

21. The system of claim 20, wherein the mobile device is configured to determine a model number identifier of the HVAC control by parsing an image of a label of the HVAC control as captured by a camera, or by the mobile device receiving the model number identifier of the HVAC control entered into the user interface, or by the HVAC control wirelessly transmitting the model number identifier of the HVAC control to the mobile wireless interface of the mobile device.

22. The system of claim 20, wherein the received settings stored in the memory of the HVAC control are retrievable via the mobile device and usable as default settings for a replacement HVAC control, which default settings are selectable, modifiable, and downloadable via the mobile device to the replacement HVAC control.

23. The system of claim 20, wherein the received settings stored in the memory of the HVAC control are retrievable directly from the memory of the HVAC control via the mobile device and downloadable as default settings directly to a replacement HVAC control via the mobile device, which default settings are selectable, modifiable, and downloadable via the mobile device.

24. The system of claim 20, wherein the received settings stored in the memory of the HVAC control are retrievable directly from the memory of the HVAC control via the mobile device and downloadable as default settings directly to a replacement HVAC control from the memory of the HVAC control via the mobile device, which default settings are automatically configured as selected settings for the replacement HVAC control that are selectable, modifiable, and downloadable via the mobile device.

25. The system of claim 20, wherein:
the mobile device is configured to determine a model number identifier of the HVAC control by parsing an image of a label of the HVAC control as captured by a camera;
the label includes at least one of a product label of the HVAC control and a barcode label of the HVAC control; and
the mobile device is configured to parse the image by recognizing characters in the product label and/or the barcode label.

26. The system of claim 20, wherein the received user input settings are retrievable directly from the memory of the HVAC control via the mobile device without retrieving the received user input settings from a remote server or the cloud.

27. The system of claim 20, wherein the mobile device is configured to:
display the received default settings from the remote server on the user interface of the mobile device;
receive adjustments to the default settings via user input at the user interface; and
wirelessly transmit the adjusted settings to the controller wireless interface of the HVAC control.

28. The system of claim 27, wherein the mobile device is configured to save the adjusted settings along with at least one of a location, an address, and a serial number of the HVAC control.

29. The system of claim 20, wherein the mobile device is configured to determine a suggested replacement HVAC control based on the identifier of the HVAC control and to display the suggested replacement HVAC control on the user interface.

30. The system of claim 20, wherein:
the mobile device is configured to obtain the default settings for the one or more HVAC system configuration parameters from the remote server based on the identifier of the HVAC control; and
the mobile device is configured to wirelessly transmit the default settings for the one or more HVAC system configuration parameters to the controller wireless interface of the HVAC control.

31. A method of configuring one or more HVAC system configuration parameters for an HVAC control for controlling the at least one HVAC component according to the one or more HVAC system configuration parameters, the method comprising:
displaying one or more HVAC system configuration parameters on a user interface of a mobile device;
receiving, via the user interface, user input settings for the one or more HVAC system configuration parameters;
wirelessly transmitting the received user input settings for the one or more HVAC system configuration parameters from the mobile device to the HVAC control;
storing the received user input settings for the one or more HVAC system configuration parameters in a memory of the HVAC control to control the at least one HVAC component according to the received user input settings for the one or more HVAC system configuration parameter; and
providing, via the user interface of the mobile device, an explanation of the impacts of making different available selections before a user chooses a defrost enable temperature.

32. The method of claim 31, wherein the method includes identifying, by the mobile device, the HVAC control by parsing an image of a label of the HVAC control as captured by a camera or the mobile device, or by receiving a model number identifier of the HVAC control entered into the user interface, or by the HVAC control wirelessly transmitting a model number identifier of the HVAC control to the mobile wireless interface of the mobile device.

33. The method of claim 31, wherein the method includes:
retrieving the received user input settings directly from the memory of the HVAC control via the mobile device without retrieving the received user input settings from a remote server or the cloud; and
downloading the received user input settings as default settings directly to a replacement HVAC control from the memory of the HVAC control via the mobile device, which default settings are automatically configured as selected settings for the replacement HVAC control that are selectable, modifiable, and downloadable via the mobile device.

34. The method of claim 31, further comprising obtaining default settings for the one or more HVAC system configuration parameters from a remote server based on the identifier of the HVAC control.

* * * * *